United States Patent [19]

Borchardt et al.

[11] Patent Number: 5,161,131
[45] Date of Patent: Nov. 3, 1992

[54] IN LINE SWITCHABLE AUDIO ENHANCEMENT DEVICE FOR CD ADAPTER

[75] Inventors: Robert L. Borchardt, New York, N.Y.; Larry Schotz, Mequon, Wis.

[73] Assignee: Recoton, Inc., Long Island City, N.Y.

[21] Appl. No.: 861,175

[22] Filed: Mar. 27, 1992

Related U.S. Application Data

[63] Continuation of Ser. No. 701,151, May 17, 1991, abandoned.

[51] Int. Cl.$^5$ .............................................. H04B 1/20
[52] U.S. Cl. ........................................... 369/1; 369/2; 381/86
[58] Field of Search ........................... 369/1-4, 369/20, 21, 289; 333/167, 172, 18, 28 T; 381/86

[56] References Cited

U.S. PATENT DOCUMENTS

| | | | |
|---|---|---|---|
| 3,202,925 | 8/1965 | Matsuzaki et al. | 333/167 |
| 3,806,839 | 4/1974 | Iwakami | 333/172 X |
| 3,910,584 | 10/1975 | Hilton | 369/1 |
| 3,914,716 | 10/1975 | Kurata | 369/1 |
| 3,946,156 | 3/1976 | Budrose | 369/1 |
| 3,978,524 | 8/1976 | Gordon et al. | 369/1 |
| 3,993,967 | 11/1976 | Saifi | 333/172 |
| 4,220,817 | 9/1980 | Kampmann | 333/28 T X |
| 4,290,027 | 9/1981 | Parker | 333/172 X |
| 4,560,963 | 12/1985 | Sharpe | 333/172 |
| 4,734,897 | 3/1988 | Schotz | 369/2 |
| 4,994,693 | 2/1991 | Popescu | 333/172 |
| 4,994,774 | 2/1991 | Joosse | 333/167 |

Primary Examiner—Stuart S. Levy
Assistant Examiner—Joseph A. Rhoa
Attorney, Agent, or Firm—Levisohn, Lerner & Berger

[57] ABSTRACT

In order to utilize standard tape players in automobiles to play compact disks, CD adapters are provided which play the CD output through the tape system of the automobile. This invention provides an in-line audio enhancement encapsulated device, manually operable by a driver to switch in the audio enhancement circuitry and adjust the audio signals produced in an efficient and safe manner so that it can be operated while a car is driven without the driver taking his eyes off the road. A bass boost circuit (24) is specifically disclosed to enhance the low frequency audio signals procuced by the automobile's audio system.

3 Claims, 3 Drawing Sheets

IN LINE SWITCHABLE AUDIO ENHANCEMENT DEVICE FOR CD ADAPTER

This is a file wrapper continuation application of application Ser. No. 07/701,151, filed May 17, 1991, now abandoned.

BACKGROUND OF THE INVENTION.

Compact Disks (CD's) are increasingly utilized worldwide.

The increasing utilization of such CD's is relatively recent, and the need has developed to play CD's in preexisting audio systems. One area in which the need has been prominent is in automobiles which are often equipped With tape cassette players but without CD players.

One of the inventors of the present invention is also the inventor of a CD adapter identified in U.S. Pat. No. 4,734,897 which describes a CD adapter comprising a blank cassette which is connected to a portable CD player, the blank cassette adapted to receive the electrical signals from the CD player and amplify those signals through the automobile's tape player system.

Users of such systems may desire to alter the audio signals by using such mechanisms as a bass booster, equalizer or the like. Such facilities are not available with present CD adapters, especially as used in automobiles, and this invention is directed to such an apparatus.

An object of the present invention is to provide an audio enhancement device connected in-line between a CD player and a CD adapter primarily used in automobiles.

Another object of this invention is to provide such an enhancement device which comprises a manually operated switch, readily accessible to the driver.

Still another object of this invention is to provide such a device which may be easily located by the driver while driving without taking his eyes from the road.

Another object of this invention is to provide an audio enhancement system which is capable of adjusting the projected audio signals in accordance with the user's desires in an efficient and convenient fashion.

Yet another object of this invention is to provide a simple, compact, readily accessible switchable mechanism used in an automobile to enhance low and high frequency audio signals.

Other objects, advantages and features of this invention will become more apparent from the following description.

SUMMARY OF THE INVENTION

In accordance with the principles of this invention, the above objects are accomplished by providing an audio frequency adjustment apparatus readily accessible to a driver in an automobile and operable by the driver without taking his eyes off the road. In particular, the invention is intended to be used with a CD adapter of the type described in the above-identified patent, in which there is provided a CD player, an output line from the CD player connected to a CD adapter in the form of a blank cassette, the cassette insertable in the tape player of an automobile, so that the CD adapter plays through the cassette into the audio system of the automobile.

The present invention provides for a filter network encapsulated within a module attached on the electrical line between the CD player and cassette adapter with a switch readily accessible on such housing to insert or remove the audio enhancement circuitry encapsulated therein. The driver, while driving, merely needs to feel along the electrical line to the encapsulated audio boost mechanism and to depress or release the switch in order to alter the audio signals produced by the automobile's audio system.

Although the present invention is shown with a single switch adaptable to insert a single low pass filter in the path between the CD player and cassette adapter, the present invention also contemplates that the enclosed encapsulated housing could include a plurality of adjustable switches to provide audio enhancement capabilities in accordance with the user's desires.

An important feature of this invention is the provision of the audio enhancement circuitry being encapsulated within a housing which is attached in-line between the CD player and CD adapter so as to be readily accessible and operable by the driver while driving without taking his eyes from the road.

Another feature of the present invention provides for enhancing of high frequency audio signals by altering the ratio of the inductance of the play heads with relationship to the input impedance to the CD adapter so that at high frequencies, the inductance across the play heads increases, thereby increasing the high frequency sounds produced by the tape player.

DETAILED DESCRIPTION OF THE INVENTION

Figure 1:
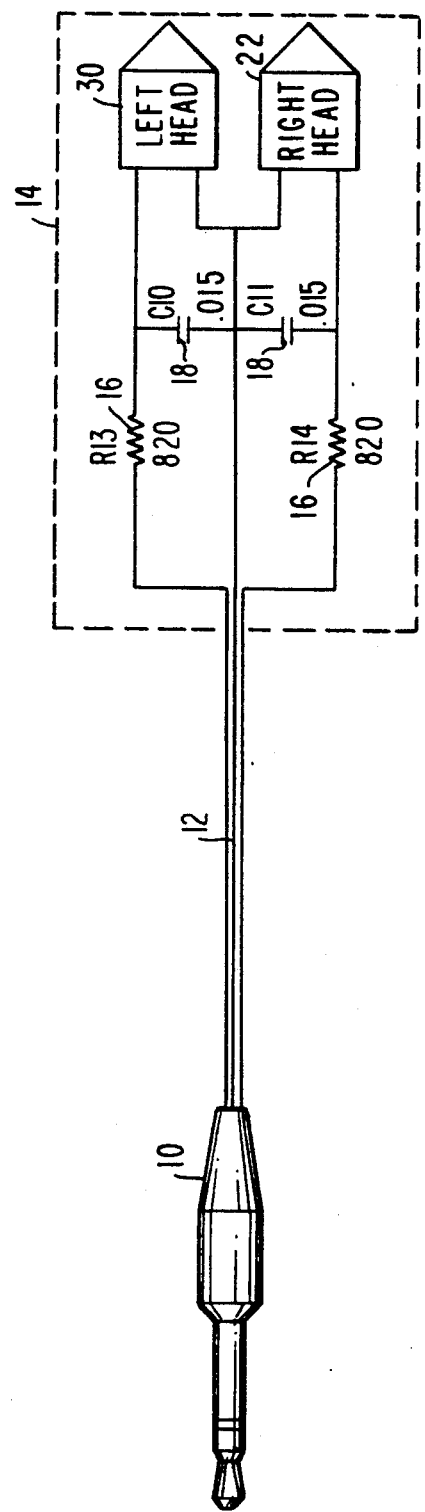
FIG. 1 is a schematic circuit of the prior art CD adapter.

This invention is primarily intended to work in automobiles in which CD adapters are employed. The above-identified prior patent describes a CD adapter which enables a CD player to play through the tape system of a standard automotive audio system. In particular, the CD adapter comprises a plug insertable into the output of a CD player (not shown), the plug being connected by electrical wire 12 to a CD adapter case 14. The CD adapter case is in the form of a standard cassette housing and includes left and right heads 20 and 22 to allow the electrical signals carried from the CD player along line 12 to operate the tape heads in the tape system of the automotive tape player in a standard fashion. An RC circuit is provided as an input circuit in the CD adapter, and in one embodiment, each resistor 16 comprises 820 ohms, while the capacitors 18 comprise 0.015 micro farads.

Figure 2:
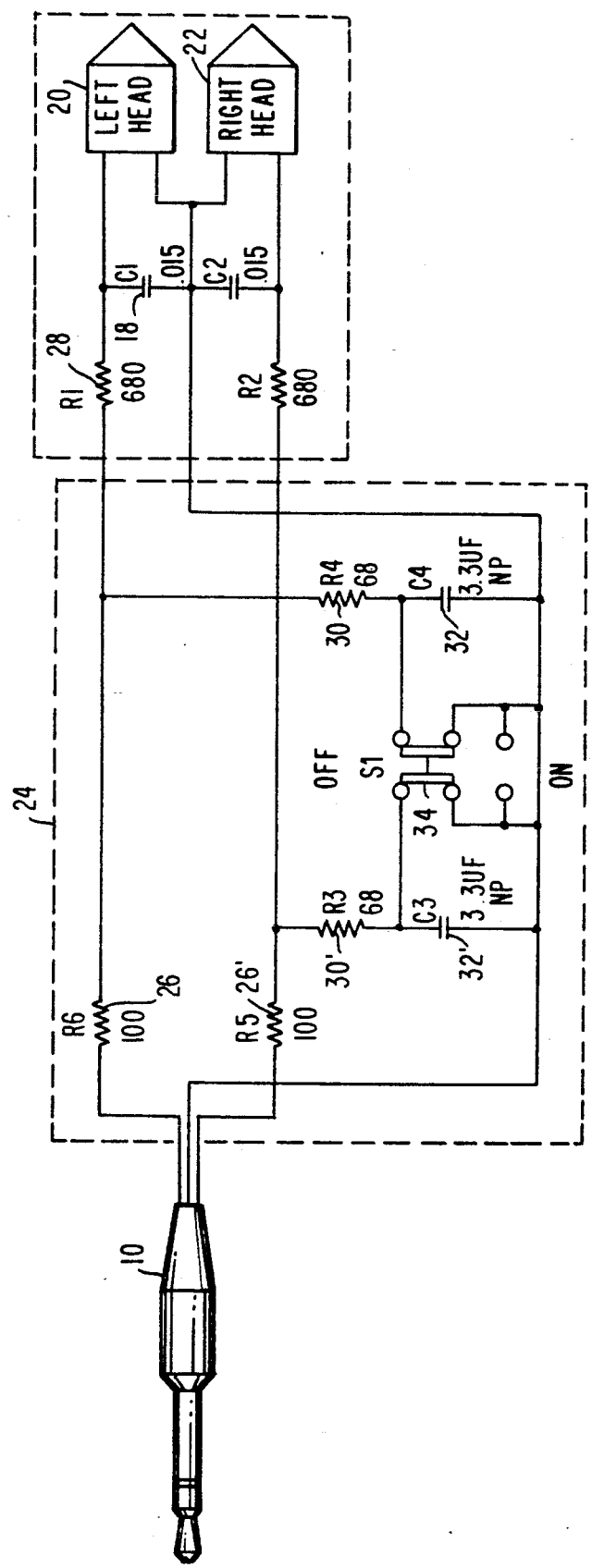
FIG. 2 is a schematic diagram of the audio enhancer circuitry of the present invention.

FIG. 2 illustrates an embodiment of the present invention in which an audio enhancement circuit 24, a low pass filter is insertable between the output of the CD player 10 and the input to the left and right heads 20 and 22 which is part of the CD adapter 14.

The low pass filter 24 comprises an RC network which is generally shown in dotted lines to designate that portion of the circuitry which will be incorporated in the encapsulated housing operable by a switch in a convenient fashion to be described hereinafter.

The audio enhancement circuitry comprises two paths, each of which is identical, feeding the left and right head. Only one path will be described, while the description of one path will apply to both.

The output of the CD player is connected to one end of a resistor 26, the output of which is connected to an input resistor 28, the output of which is connected to the input of left head. Capacitor 18 is located within the CD adapter as in the prior art. One end of a resistor 30 is connected to the junction between resistors 26 and 28, while the other end of resistor 30 is connected in series with a capacitor 32, and a switch 34 is connected across capacitor 32. In one mode of the operation of switch 34, capacitor 32 is bypassed, whereas in the other mode, (the on mode) of the operation of switch 34, capacitor 32 is operably connected in series with resistor 30. When switch 34 is operated to allow capacitor 32 to be connected in series with resistor 30, a low pass filter is provided such that at low audio frequencies, the impedance value of capacitor 32 is significantly greater than that of resistor 30 and resistor 26 so that the signal presented as the input to the left and right heads of the tape player increases so as to provide a bass boost effect. When switch 34 is in its off mode, capacitor 34 is bypassed, so that there is no bass boost or low frequency alteration of the operation of the input circuitry feeding the CD adapter.

Identical circuitry is provided for both the left and right head as shown in FIG. 2 and is illustrated with primed numerals, so that substantially similar audio frequency enhancement to the signal emanating from the CD player is provided for both heads.

As another feature of the present invention, the value of resistor 28 is 680 ohms as contrasted with 820 ohms in the prior art. The reduction in value of these resistors emphasizes the high frequency impedance effect achieved by the inductance which is part of the left and right heads, so that a high frequency enhancement is also achieved with the present circuitry.

Figure 3:
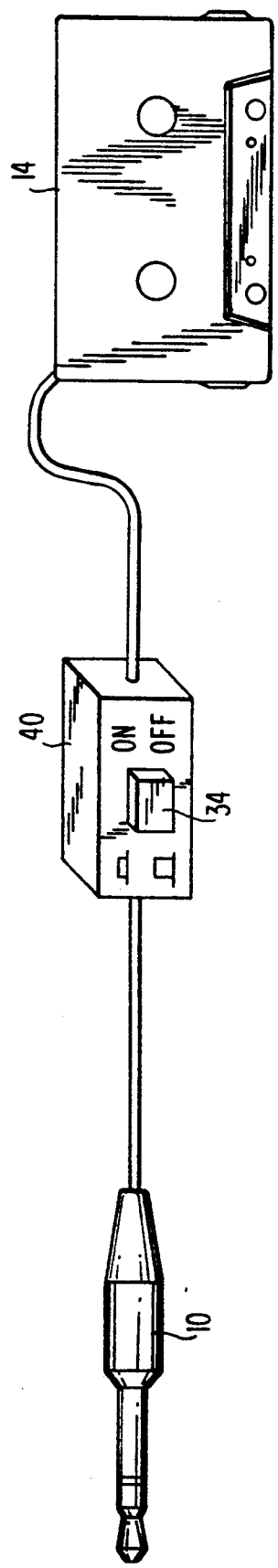
FIG. 3 is a pictorial perspective representation of the circuitry of FIG. 2 encapsulated within a manually switchable housing located in-line between the CD player and CD adapter.

FIG. 3 illustrates the manner in which the audio enhancement apparatus is encapsulated within an easily actuable switching mechanism housing to enable a driver to operate the audio enhancement mechanism without taking his eyes off the road. In particular, the audio enhancement circuitry shown within dotted lines 24 is encapsulated within a small plastic housing 40 connected in-line between the output of CD player 10 which is a plug and the input of CD adapter 14. By connecting the housing along the electrical line from the CD player to the CD adapter and by locating a switch on the outside of housing 40, a driver merely needs to feel for the electrical cord and locate the housing switch 34 to actuate the audio enhancement circuit.

Preferably, the housing is made of a plastic or otherwise easily moldable assembly and is ruggedly constructed.

The present invention has been described with an audio enhancement circuit as illustrated in FIG. 2. It is understood that any audio enhancement circuitry could be employed within housing 40, so that the ability to provide a more sophisticated frequency adjustment mechanism, such as with manually operated equalizer potentiometers mounted on the housing could also achieve so long as the circuitry is encapsulated in the housing readily accessible to the driver. Preferably, the housing should be located in-line connected to the physical electrical output line from the CD player so that the driver can easily locate the housing, operate the switch and other potentiometers, merely by feel, without taking his eyes off the road while driving.

This invention has been described with a preferred embodiment, both other variations of the invention will be apparent to those of ordinary skill in the art without departing from the scope of the invention that is set forth in the appended claims.

What is claimed is:

1. A manually switched audio enhancement device comprising a CD adapter usable by a driver seated in the driver's seat of an automobile, said CD adapter insertible in an automobile tape player, a CD player having an output connected to said CD adapter, a flexible electrical conductor comprising a covered elongated electrical wire means connected between said CD player and said CD adapter, said electrical conductor being located proximate to the driver's seat, said audio enhancement device being contained within a housing, said housing comprising a switch to operate said audio enhancement device, said audio enhancement device connected along the electrical conductor between said CD player and said CD adapter enabling the driver to physically reach and feel along the flexible electrical conductor for the housing and switch of the audio enhancement device to switch the audio enhancement device on or off without having to look at said audio enhancement device and switch, said CD adapter comprising magnetic play heads comprising inductance means, an input impedance network including a resistor having a resistance of about 680 ohms emphasizing a high frequency impedance effect, connected between the output of said CD player and said inductance means, said input impedance having a value in combination with that of said inductance means to produce increased signal levels across said magnetic play heads in the high audio frequency ranges and produce a bass boost; and wherein said audio enhancement device further includes: first and second resistors (30) in parallel; first and second capacitors (32) in series with said first and second resistors; and said switch is operable to allow said first resistor to be connected in series with said first capacitor, and said second resistor to be connected in series with said second capacitor when said switch is in an on mode.

2. An audio enhancement device as set forth in claim 1, wherein said audio enhancement circuit and said CD adapter operates to increase high frequency audio signals produced by said tape player.

3. An audio enhancement device as set forth in claim 1, wherein said housing is molded of plastic, and said switch is incorporated in said plastic housing.

* * * * *